United States Patent
Choi et al.

(10) Patent No.: US 12,068,467 B2
(45) Date of Patent: Aug. 20, 2024

(54) BATTERY PACK AND DEVICE INCLUDING THE SAME

(71) Applicant: LG ENERGY SOLUTION, LTD., Seoul (KR)

(72) Inventors: Jonghwa Choi, Daejeon (KR); Junyeob Seong, Daejeon (KR); Myungki Park, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 475 days.

(21) Appl. No.: 17/437,618

(22) PCT Filed: Jun. 29, 2020

(86) PCT No.: PCT/KR2020/008431
§ 371 (c)(1),
(2) Date: Sep. 9, 2021

(87) PCT Pub. No.: WO2021/075666
PCT Pub. Date: Apr. 22, 2021

(65) Prior Publication Data
US 2022/0190404 A1    Jun. 16, 2022

(30) Foreign Application Priority Data
Oct. 18, 2019  (KR) .................. 10-2019-0129953

(51) Int. Cl.
*H01M 10/6551* (2014.01)
*H01M 10/658* (2014.01)
*H01M 50/24* (2021.01)

(52) U.S. Cl.
CPC ..... *H01M 10/6551* (2015.04); *H01M 10/658* (2015.04); *H01M 50/24* (2021.01); *H01M 2220/20* (2013.01)

(58) Field of Classification Search
CPC .......... H01M 10/658; H01M 2220/20; H01M 10/6551; H01M 50/24
(Continued)

(56) References Cited

U.S. PATENT DOCUMENTS 2,009,999 A * 8/1935 Grant ..................... A47J 45/08
                                                                      220/753
2005/0089751 A1   4/2005 Oogami et al.
(Continued)

FOREIGN PATENT DOCUMENTS

CN    203983360 U     12/2014
CN    104802354 A  *  7/2015 ............. B29C 41/36
(Continued)

OTHER PUBLICATIONS

International Search Report for PCT/KR2020/008431 mailed on Sep. 28, 2020.
(Continued)

*Primary Examiner* — Allison Bourke
*Assistant Examiner* — Robert Gene West
(74) *Attorney, Agent, or Firm* — Birch, Stewart, Kolasch & Birch, LLP (57) ABSTRACT

Discussed is a battery pack that prevents a heat transfer phenomenon, and a device including the same. The battery pack includes: a battery module frame accommodating a battery cell stack, a battery pack frame, on which the battery module frame is mounted, and a battery module mounting part formed in the battery pack frame to mount the battery module frame to to the battery pack frame, wherein a heat insulation member is formed between the battery module mounting part and the battery module frame.

16 Claims, 10 Drawing Sheets

(58) Field of Classification Search
USPC .......................................................... 429/120
See application file for complete search history.

(56) References Cited

U.S. PATENT DOCUMENTS

| | | |
|---|---|---|
| 2006/0246350 A1 | 11/2006 | Takayama et al. |
| 2013/0149571 A1 | 6/2013 | Lee et al. |
| 2017/0077466 A1 | 3/2017 | Choi et al. |
| 2017/0200925 A1 | 7/2017 | Seo et al. |
| 2018/0053921 A1 | 2/2018 | Kim et al. |
| 2018/0114961 A1 | 4/2018 | Kim et al. |
| 2018/0309100 A1 | 10/2018 | Kim et al. |
| 2020/0044210 A1 | 2/2020 | Enomoto et al. |
| 2020/0274120 A1 | 8/2020 | Chen et al. |
| 2022/0231365 A1 | 7/2022 | Lee |

FOREIGN PATENT DOCUMENTS

| | | |
|---|---|---|
| CN | 208923207 U | 5/2019 |
| CN | 110178263 A | 8/2019 |
| CN | 209344284 U | 9/2019 |
| DE | 102015011895 A1 * | 4/2016 .......... H01M 10/658 |
| EP | 1 523 051 A2 | 4/2005 |
| EP | 1 710 859 A1 | 10/2006 |
| JP | 2006-347159 A | 12/2005 |
| JP | 2006-331648 A | 12/2006 |
| JP | 2007-42397 A | 2/2007 |
| JP | 6310990 B1 | 4/2018 |
| JP | 2018-527735 A | 9/2018 |
| KR | 10-2008-0047641 A | 5/2008 |
| KR | 10-2012-0096624 A | 8/2012 |
| KR | 10-2015-0138626 A | 12/2015 |
| KR | 10-2016-0129597 A | 11/2016 |
| KR | 10-2017-0033070 A | 3/2017 |
| KR | 10-2018-0044083 A | 5/2018 |
| KR | 10-2019-0112465 A | 10/2019 |
| WO | WO 2017/209138 A1 | 12/2017 |
| WO | WO-2019155713 A1 * | 8/2019 .......... H01M 10/625 |

OTHER PUBLICATIONS

Extended European Search Report for European Application No. 20877950.4, dated May 19, 2022.

* cited by examiner

BATTERY PACK AND DEVICE INCLUDING THE SAME

TECHNICAL FIELD

Cross Citation with Related Application(s)

This application claims the benefit of Korean Patent Application No. 10-2019-0129953 filed on Oct. 18, 2019 with the Korean Intellectual Property Office, the disclosure of which is incorporated herein by reference in its entirety.

The present disclosure relates to a battery pack and a device including the same, and more particularly to a battery pack that prevents heat transfer phenomenon, and a device including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Such a battery module constituting such a battery pack includes a battery cell stack in which a plurality of battery cells are stacked, a battery module frame accommodating a battery cell stack, and a battery module mounting part formed on the battery module frame so that the battery module frame is mounted on the battery pack frame.

Figure 1:
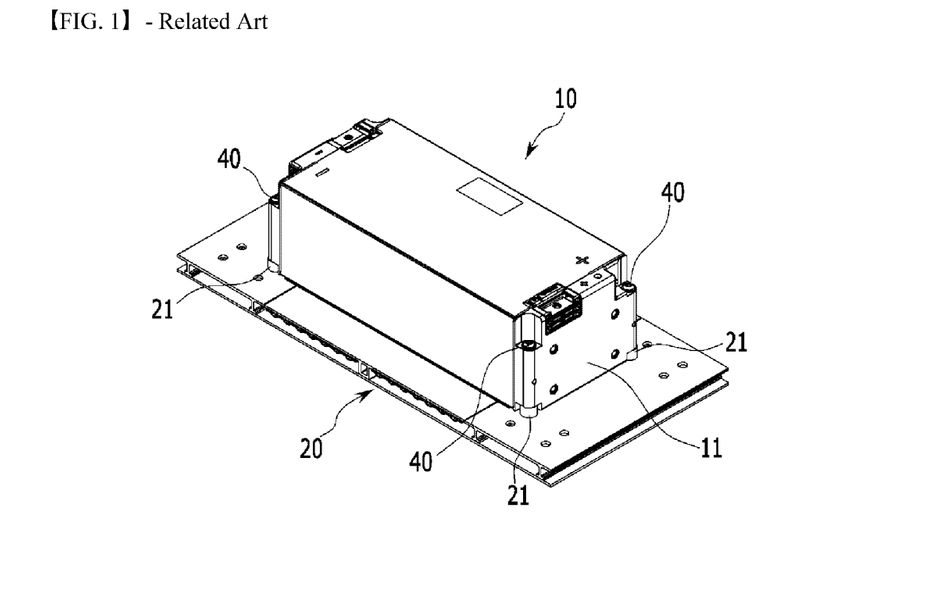
FIG. 1 is a view illustrating a state, in which a battery module frame is mounted on a battery pack frame, according to a related art.
Figure 2:
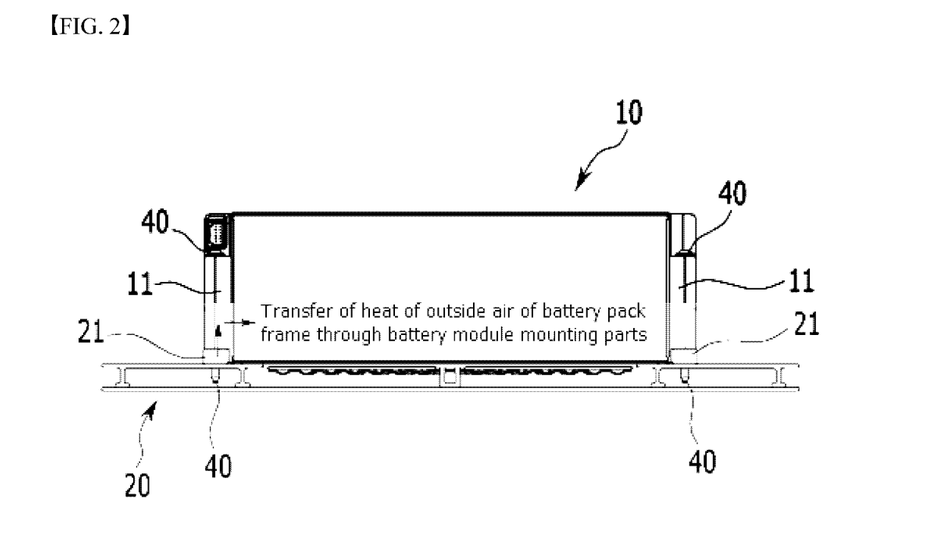
FIG. 2 is a view illustrating a state, in which heat is transferred from the battery pack frame to the battery module frame according to the related art.

FIG. 1 is a view illustrating a state, in which a battery module frame is mounted on a battery pack frame according to the related art. FIG. 2 is a view illustrating a state, in which heat is transferred from the battery pack frame to the battery module frame according to the related art.

Referring to FIGS. 1 and 2, when a battery module frame 10 is mounted on a battery pack frame 20, end plates 11 formed on front and rear surfaces of the battery module frame 10 contact battery module mounting parts 21 formed at an upper end of the battery pack frame 20, and the end plates 11 and the battery module mounting parts 21 are coupled to each other through mounting members 40. Here, the heat of the battery pack may be transferred to the battery module mounting parts 21 of the battery pack frame 20, and the end plates 11 and the battery module frame 10, which contact the battery module mounting parts 21, and is transferred to a plurality of battery cells of a battery cell stack, which are accommodated in the interior of the battery module frame 10.

Here, a battery pack mounted a device such as a vehicle may be exposed to the outside, high and low temperature gradients that occur on vehicle-related electronic components formed on the outside of the battery pack may be transferred a battery module through the battery pack frame. In this way, when the outside of battery pack is formed at high or low temperatures, the battery module formed in the interior of the battery pack is influenced by the temperature gradient of the outside of the battery pack so that the performance of the plurality of battery cells, which are formed in the battery module, may be decreased as a whole.

DETAILED DESCRIPTION OF THE INVENTION

Technical Problem

It is an object of the present disclosure to provide a battery pack that prevents heat transfer phenomenon between the inside and the outside of the battery pack.

However, the problem to be solved by the embodiments of the present disclosure is not limited to the above-described problems, and can be variously expanded within the scope of the technical idea included in the present disclosure.

Technical Solution

In order to achieve the above object, one embodiment of the present disclosure provides a battery pack and a device including the same, the battery pack including: a battery module frame accommodating a battery cell stack, a battery pack frame, on which the battery module frame is mounted, and a battery module mounting part formed in the battery pack frame and allow the battery module frame to be mounted on the battery pack frame, and an insulation member is formed between the battery module mounting part and the battery module frame.

The battery module mounting part and the battery module frame may be coupled to each other through a mounting member.

The battery module frame may include end plates covering front and rear surfaces of the battery cell stack, and the mounting member may be inserted through a through-hole formed at each of both ends of the end plates.

The mounting member may include a head part formed at one end thereof and a body part, and the head part may be mounted so as to make contact with an upper surface of the through-hole.

The insulation member may be formed between the head part and the upper surface of the through-hole.

The insulation member may be formed between the through-hole of the end plate and the mounting member inserted into the through-hole.

The mounting member may include a head part formed at one end thereof and a body part, and the insulation member may be formed between the body part and the through-hole.

The insulation member may be formed so as to surround the mounting member.

The through-hole may be formed in the battery module mounting part, and the mounting member may pass through the through-hole and may be coupled to the through-hole.

The mounting member may pass through the through-hole of the battery module mounting part to be inserted up to the interior of the battery pack frame.

The mounting member may be formed of a bolt.

The battery pack frame and the battery module mounting part may be formed of a metal.

A heat sink may be mounted in the interior of the battery pack frame.

The heat sink may be mounted in the interior of a frame surface of the battery pack frame, on which the battery module frame is mounted.

Advantageous Effects

The battery pack according to the embodiment of the present disclosure and the device including the same can prevent heat transfer phenomenon between the outside of the battery pack and the battery module in the interior of the battery pack, and provides the effect of minimizing an influence of the temperature outside the battery pack.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

As used herein, terms such as first, second, and the like may be used to describe various components, and the terms are used only to discriminate one component from another component.

Further, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, operation, constitutional elements, or combinations thereof, but it should be understood that they do not preclude a possibility of existence or addition of one or more other features, numbers, steps, operation, constitutional elements, or combinations thereof.

Hereinafter, a battery pack according to an embodiment of the present disclosure will be described with reference to FIGS. 3 to 6.

Figure 3:
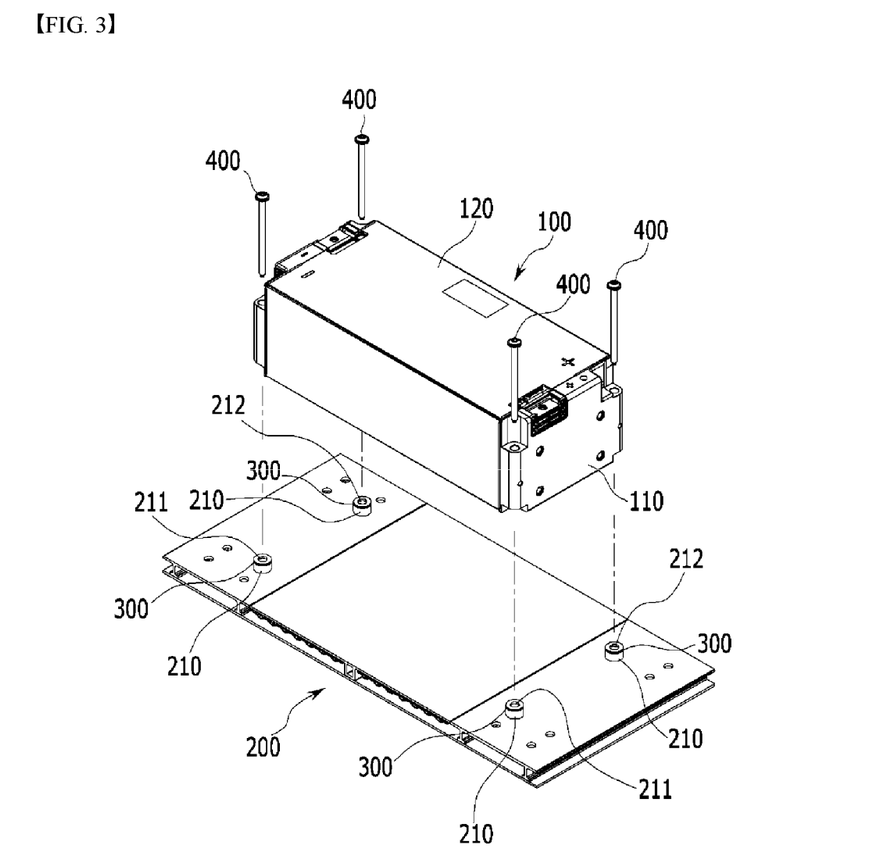
FIG. 3 is a view illustrating a state before a battery pack is assembled according to an embodiment of the present disclosure.
Figure 4:
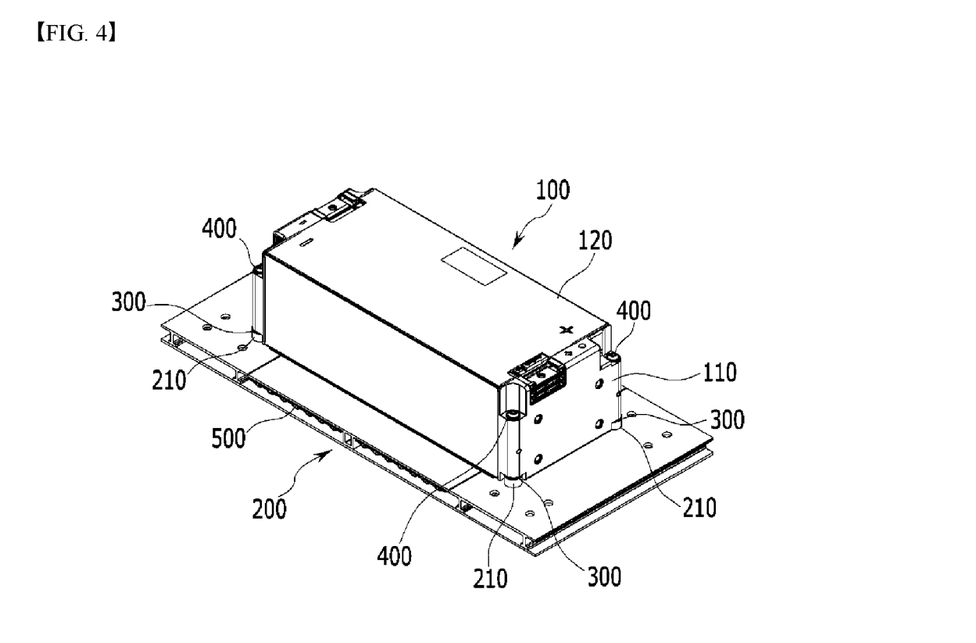
FIG. 4 is a view illustrating a state after a battery pack is assembled according to the embodiment of the present disclosure.
Figure 5:
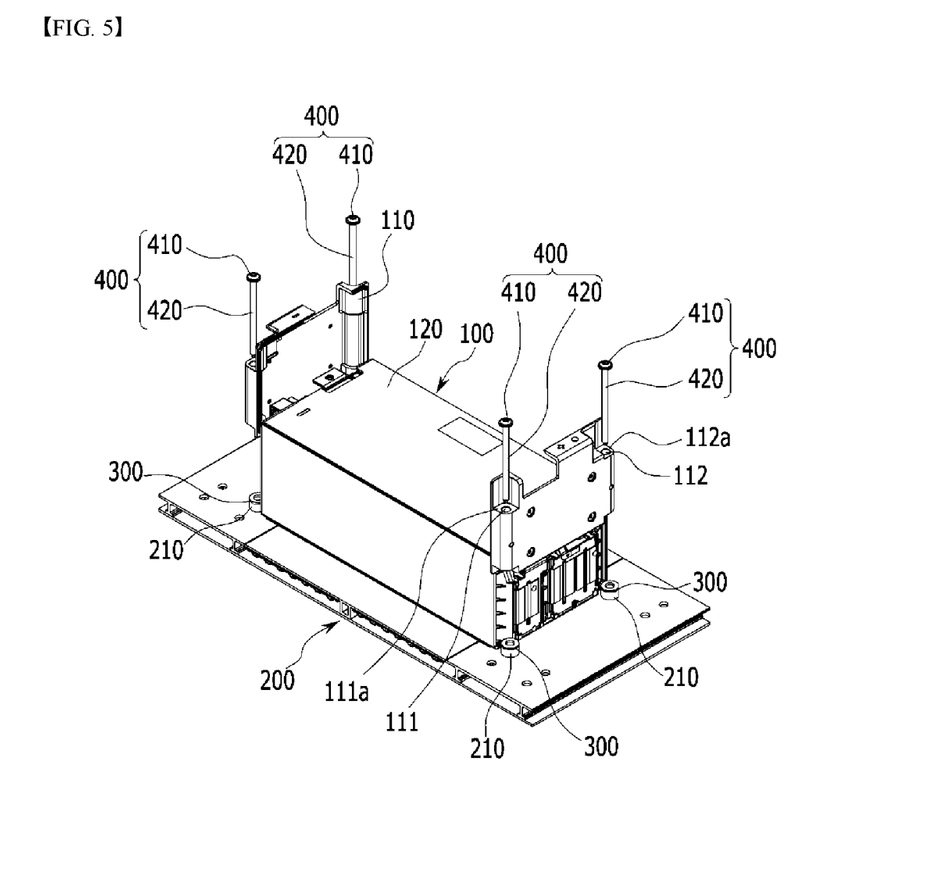
FIG. 5 is an exploded perspective view illustrating the battery pack according to the embodiment of the present disclosure.
Figure 6:
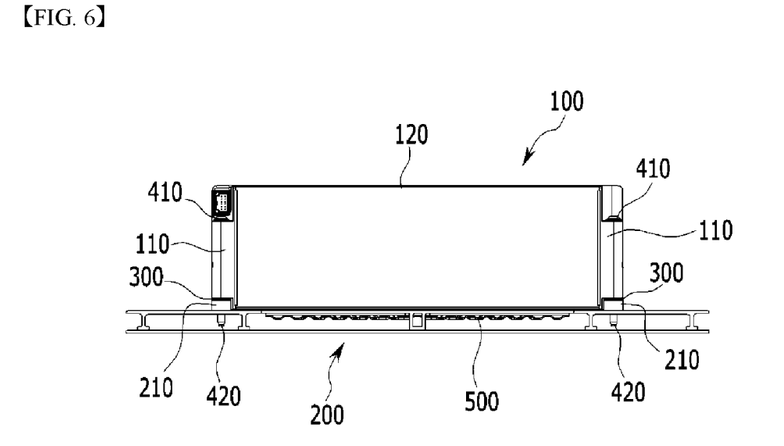
FIG. 6 is a side view illustrating the battery pack according to the embodiment of the present disclosure.

FIG. 3 is a view illustrating a state before a battery pack is assembled, according to an embodiment of the present disclosure. FIG. 4 is a view illustrating a state after a battery pack is assembled according to the embodiment of the present disclosure. FIG. 5 is an exploded perspective view illustrating the battery pack according to the embodiment of the present disclosure. FIG. 6 is a side view illustrating the battery pack according to the embodiment of the present disclosure.

Referring to FIGS. 3 and 6, the battery pack according to the embodiment of the present disclosure includes a battery module frame 100 accommodating a battery cell stack, a battery pack frame 200, on which the battery module frame 100 is mounted, and a battery module mounting part 210 formed in the battery pack frame 200 and allow the battery module frame 100 to be mounted on the battery pack frame 200, and an insulation member (or a heat insulation layer) 300 is formed between the battery module mounting part 210 and the battery module frame.

A battery cell is a secondary battery, which may be configured of a pouch type secondary battery. The battery cell may be formed of a plurality of cells and the plurality of the battery cells may be mutually stacked so as to be electrically connected to each other, and thus the battery cell stack may be formed. Each of the plurality of the battery cells may include an electrode assembly, a battery case, and electrode leads protruding from the electrode assembly.

The battery module frame 100 accommodates the battery cell stack, in which the plurality of battery cells are stacked and formed, to physically protect the battery cell stack. The battery module frame 100 may include end plates 110 formed so as to cover front and rear surfaces of the battery cell stack and a central frame 120 formed so as to cover the upper, lower, left, and right surfaces of the battery cell stack.

The end plates 110 may be coupled to the central frame 120 through welding and can physically protect busbar frames formed between the end plates 110 and the battery cell stack, and the battery cell stack.

The battery pack frame 200 is formed so as to accommodate the battery module frame 100. The battery pack frame 200 can physically protect the plurality of battery cells accommodated in the battery module frame 100, and may be mounted on various devices requiring power, to supply electric power generated by the battery modules formed in the interior of the battery pack frame 200 to the devices. According to an embodiment of the present disclosure, the battery module frame 100 may be mounted on an upper side of the battery pack frame 200.

In more detail, the battery module mounting part 210, on which the battery module frame 100 may mounted, is formed on an upper surface of the battery pack frame 200, and the battery module frame 100 may be coupled to the battery pack frame 200 through a method of mounting the battery module frame 100 on the battery module mounting part 210.

A mounting member 400 may couple the battery module mounting part 210 and the battery module frame 100. In more detail, through-holes 111 and 112 are formed at both ends of the end plates 110 formed on the front and rear sides of the battery module frame 100, through-holes 211 and 212 are also formed in the battery module mounting part 210 formed at an upper surface of the battery pack frame 200, and the mounting members may integrally pass through the through-holes 111 and 112 formed at the both ends of the end plates 110, and the through-holes 211 and 212 formed in the battery module mounting parts 210, to couple the end plates 110 and the battery module mounting parts 210. The mounting members 400 may pass through the through-holes 211 and 212 to be inserted up to the interior of the battery pack frame 200.

According to the embodiment of the present disclosure, the mounting members 400 may include a head part 410 formed at one end thereof and a body part 420. The body parts 420 of the mounting members 400 may be inserted into upper ends of the through-holes 111 and 112 formed at the both ends of the end plates 110.

The body parts 420, which have passed through the through-holes 111 and 112, pass through the through-holes 211 and 212 of the battery module mounting parts 210, which meet lower ends of the through-holes 111 and 112 in the same axis, and as illustrated in FIG. 6, end portions of the body parts 420 may pass through the interior of the battery pack frame 200 to be mounted.

The head parts 410 may be formed of a width that is larger than the through-holes 111 and 112. Accordingly, as illustrated in FIG. 6, lower ends of the head parts 410 may be mounted to contact upper surfaces 111a and 112a of the through-holes.

According to the embodiment of the present disclosure, the mounting members 400 may be formed of bolts. However, the mounting members are not limited to bolts and may couple the battery module frame and the battery pack frame by utilizing various embodiments.

A heat sink 500 may be mounted in the interior of a frame surface of battery pack frame 200, on which the battery module frame 100 is mounted. Heat generated by the plurality of battery cells accommodated in the interior of the battery module frame 100 may be cooled through the heat sink 500

The insulation members 300 may be formed between the battery module mounting parts 210 and the battery module frame 100. Through this, heat transferred to the battery pack frame 200 and the battery module frame 100 connected thereto may be blocked.

When both of the battery pack frame 200 and the battery module frame 100 are made of a metal, according to the related art, heat is transferred between the battery module mounting parts 210 and the battery pack frame 200 so that heat is transferred between the battery pack frame 200, in which a temperature gradient is present due to an influence of the outside, and the battery module frame 100, and thus the plurality of battery cells accommodated in the battery module frame 200 may be directly influenced by the temperature of the battery pack frame 200. When the battery cells are directly influenced by the external temperature due to the characteristics of the battery cells, which are sensitive to a temperature change, there may be a problem in the performance of the battery module.

According to the embodiment of the present disclosure, the insulation members 300 are formed between the battery module mounting parts 210 and the end plates 110 of the battery module frame 100 so that the battery module mounting parts 210 and the end plates 110 are prevented from contacting each other, and thus heat transfer due to the contact of the metals are interrupted in advance, and an influence of the external temperature on the battery cells can be minimized.

Hereinafter, a battery pack according to another embodiment of the present disclosure will be described with reference to FIGS. 7 to 9.

Figure 7:
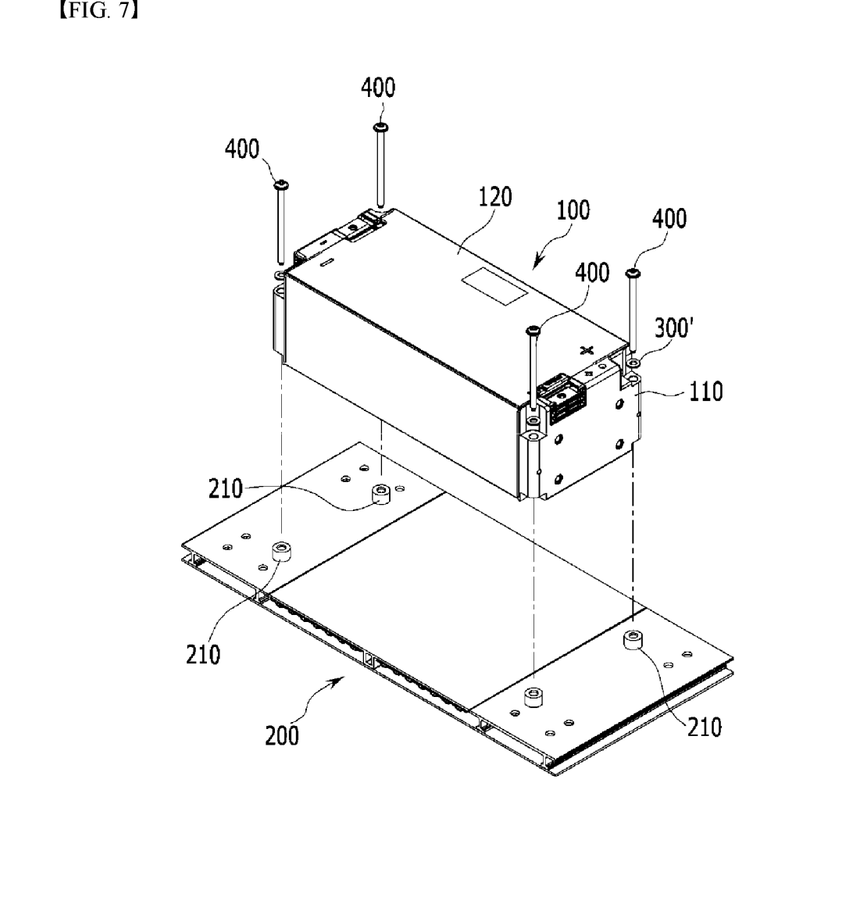
FIG. 7 is a view illustrating a state before a battery pack is assembled according to another embodiment of the present disclosure.

FIG. 7 is a view illustrating a state before a battery pack is assembled according to another embodiment of the present disclosure. FIG. 8 is an exploded perspective view illustrating the battery pack according to the another embodiment of the present disclosure. FIG. 9 is a side view illustrating the battery pack according to the another embodiment of the present disclosure.

Figure 8:
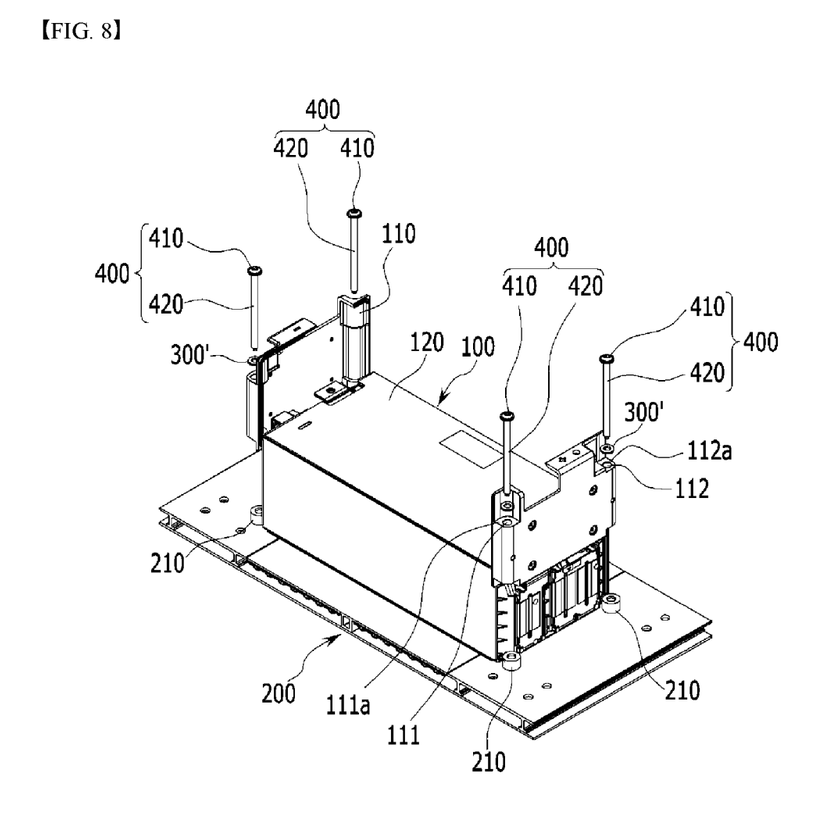
FIG. 8 is an exploded perspective view illustrating the battery pack according to the another embodiment of the present disclosure.
Figure 9:
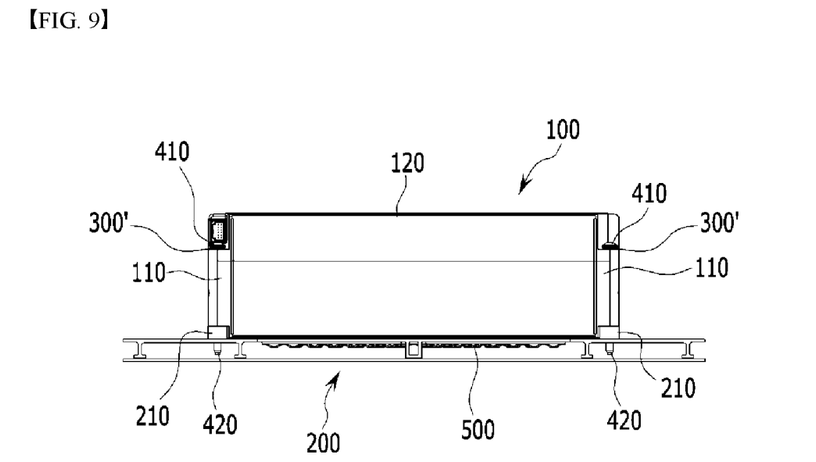
FIG. 9 is a side view illustrating the battery pack according to the another embodiment of the present disclosure.

Referring to FIGS. 7 to 9, insulation members 300' according to the embodiment of the present disclosure may be formed between head parts 410 of mounting members 400 and upper surfaces 111a and 112a of through-holes 111 and 112 formed at both ends of end plates 110.

The mounting members 400 may be formed to pass through all of the through holes 111 and 112 of the end plates 110, and through-holes 211 and 212 of battery module mounting parts 210. Accordingly, heat generated from battery pack frame 200 may be transferred to a battery module frame 100 through the mounting members 400.

Because the head parts 410 of the mounting members 400 are mounted so as to contact the upper surfaces 111a and 112a of the through-holes 111 and 112, heat transferred to the head parts 410 of the mounting members 400 may be transferred to the battery module frame 100 and a plurality of battery cells accommodated thereto through the upper surfaces 111a and 112a of the through-holes of the end plates 110.

Accordingly, according to the embodiment of the present disclosure, the insulation members 300' are formed between the head parts 410 of the mounting members 400, on which the mounting members 400 and the end plates 110 may contact each other, and the upper surfaces 111a and 112a of the through-holes, so that the mounting members 400 are prevented from contacting the end plates 110 to interrupt heat transfer through the contacts in advance, and an influence of external temperature on the battery cells can be minimized.

The contents of the battery module and the battery pack according to the another embodiment of the present disclosure are the same as the contents described above, except for the above-described contents.

Hereinafter, a battery pack according to another embodiment of the present disclosure will be described with reference to FIGS. 10 and 11.

Figure 10:
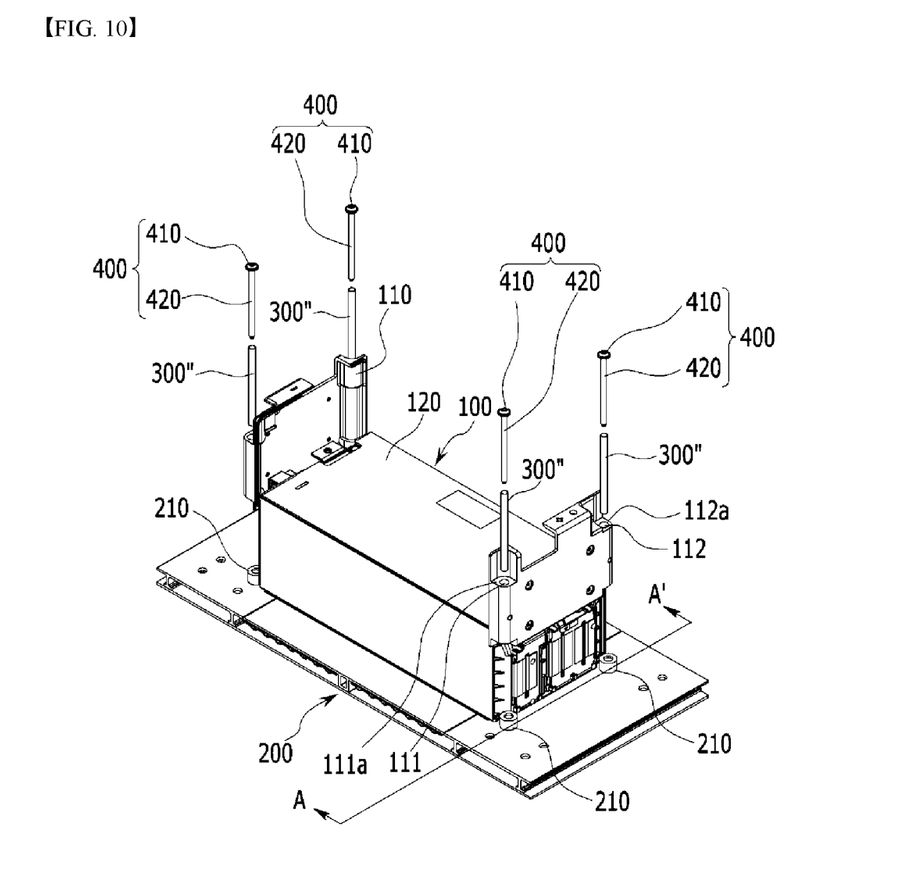
FIG. 10 is an exploded perspective view illustrating a battery pack according to another embodiment of the present disclosure.
Figure 11:
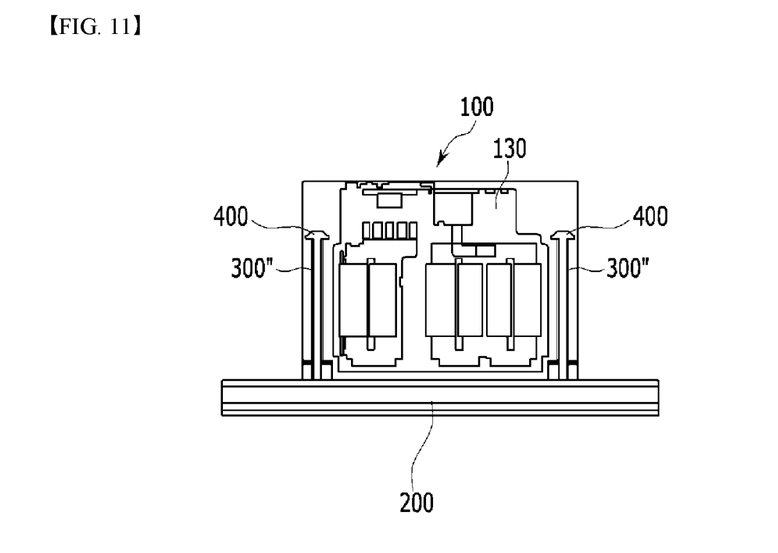
FIG. 11 is a cross-sectional view illustrating the battery pack according to another embodiment of the present disclosure.

FIG. 10 is an exploded perspective view illustrating a battery pack according to another embodiment of the present disclosure; and FIG. 11 is a cross-sectional view illustrating the battery pack according to another embodiment of the present disclosure.

Referring to FIGS. 10 to 11, insulation members 300" according to the embodiment of the present disclosure may be formed between through-holes 111 and 112 of end plates 110, and mounting members 400 inserted into the through-holes 111 and 112. In more detail, each of the mounting members 400 includes a head part 410 formed at one end thereof and a body part 420, and the insulation members 300" may be formed between the body parts 420 and the through-holes 111 and 112. Here, the insulation members 300" may be formed so as to surround the mounting members 400.

When the mounting members 400 are inserted into the through-holes 111 and 112, outer surfaces of the mounting members 400 and inner surfaces of the through-holes 111 and 112 may contact each other, and in this way, when the mounting member 400 and the through-holes 111 and 112 contact each other, heat may be transferred between the mounting member 400 connected to a battery pack frame 200, the end plates 110 having the through-holes 111 and 112, and a busbar frame 130 connected to the end plates 110, and a plurality of battery cells.

Accordingly, according to the another embodiment of the present disclosure, the insulation members 300" are formed between the outer surfaces of the mounting members 400, on which the mounting members 400 and the end plates 110 contact each other, and the inner surfaces of the through-holes 111 and 112, so that heat transfer due to the contacts of the mounting members 400 and the inner surfaces of the through-holes 111 and 112 may be interrupted in advance, and an influence of the external temperature on the battery cells can be minimized.

The battery pack may have a structure which has packed together with a battery management system (BMS) and a cooling device that control and manage battery's temperature, voltage, etc.

The battery pack can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module frame
110: end plate
120: central frame
130: busbar frame
111, 112: through-hole
111a, 112a: upper surface of through-hole
200: battery pack frame
210: battery module mounting part
211, 212: through-hole
300, 300', 300": insulation member
400: mounting member
410: head part
420: body part
500: heat sink

The invention claimed is:

1. A battery pack comprising:
a battery module frame accommodating a battery cell stack;
a battery pack frame on which the battery module frame is mounted; and
a battery module mounting part formed in the battery pack frame to mount the battery module frame to the battery pack frame, the battery module mounting part having a height and protruding from a surface of the battery pack frame towards the battery module frame,
wherein a heat insulation member is formed between the battery module mounting part and the battery module frame,
wherein the heat insulation member has a hole that penetrates the heat insulation member, and
wherein through-holes are formed in the battery module mounting part, and mounting members pass through the through-holes and are coupled to the through-holes.

2. The battery pack of claim 1, wherein the battery module mounting part and the battery module frame are coupled to each other through a mounting member of the mounting members.

3. The battery pack of claim 2, wherein the battery module frame includes end plates covering front and rear surfaces of the battery cell stack, and the mounting member is inserted through a through-hole formed at each of both ends of the end plates.

4. The battery pack of claim 3, wherein the mounting member includes a head part formed at one end thereof and a body part, and the head part is mounted to make contact with an upper surface of the through-hole.

5. The battery pack of claim 4, wherein the heat insulation member is formed between the head part and the upper surface of the through-hole.

6. The battery pack of claim 3, wherein the heat insulation member is formed between the through-hole of the end plate and the mounting member inserted into the through-hole.

7. The battery pack of claim 6, wherein the mounting member includes a head part formed at one end thereof and a body part, and the insulation member is formed between the body part and the through-hole.

8. The battery pack of claim 6, wherein the heat insulation member is formed to surround the mounting member.

9. The battery pack of claim 1, wherein the mounting members pass through the through-holes to be inserted up to an interior of the battery pack frame.

10. The battery pack of claim 2, wherein the mounting member is formed of a bolt.

11. The battery pack of claim 1, wherein the battery pack frame and the battery module mounting part are formed of a metal.

12. The battery pack of claim 1, wherein a heat sink is mounted in an interior of the battery pack frame.

13. The battery pack of claim 12, wherein the heat sink is mounted in an interior of a frame surface of the battery pack frame, on which the battery module frame is mounted.

14. A device comprising the battery pack of claim 1.

15. The battery pack of claim 2, wherein the mounting member extends in a same direction as an axis of the hole of the heat insulating member.

16. The battery pack of claim 1, wherein the heat insulation member is a cylinder having a length extending from the surface of the battery pack frame at a proximal end of the battery module frame towards a distal end of the battery module frame.

* * * * *